FOCUSING OF OPTICAL VIEWING APPARATUS

This invention relates to the focusing of optical viewing apparatus, and is particularly although not exclusively concerned with enabling optical microscopes to be focused upon reflecting surfaces more precisely than is currently possible, without recourse to complex photoelectric instrumentation.

Microscopes are frequently used for the measurement of small features on or intimately associated with reflecting surfaces, e.g. circuit elements on the surface of a silicon substrate. It is known that the precision with which such measurements can be made depends upon extremely accurate focusing of the microscope. The usual focusing criterion of optimum image sharpness is often insufficiently precise, and tends to prove fatiguing over extended periods.

The invention, is preferred embodiments, aims to circumvent this difficulty by a novel form of instrumentation which exploits the principle of distance location by detection of the precise point of intersection of two mutually inclined beams of light. For example, in optical range-finding, distance is determined by changing the angular inclination of two beams until the identical images they bear are seen to coincide. In the present invention, this angular inclination is kept constant, and, for example, the distance between a microscope objective and an object surface is adjusted (focused) to bring corresponding images of a target pattern into coincidence.

According to one aspect of the present invention, there is provided optical viewing apparatus provided with a focusing arrangement, comprising means for providing two beams of light, mutually inclined at a fixed angle, means for converging said beams of light in the vicinity of a reflective viewed surface, and means for adjusting the relative distance between said apparatus and said surface until said beams coincide at said surface.

According to another aspect of the present invention, there is provided a method of focusing optical viewing apparatus, comprising the steps of converging two beams of light, mutually inclined at a fixed angle, in the vicinity of a reflective viewed surface, and adjusting the relative distance between the apparatus and said surface until said beams coincide at said surface.

BRIEF DESCRIPTION OF THE DRAWINGS

The accompanying diagrammatic drawings illustrate preferred arrangements of optical imaging apparatus according to the invention in which.

DESCRIPTION OF PREFERRED EMBODIMENTS

The invention will now be described in detail, by way of example only, with reference to optical viewing apparatus in the form of a microscope, though it should be understood that the invention is applicable generally to optical viewing apparatus. Only those microscope parts necessary to the understanding of the invention have been shown.

Figure 1:
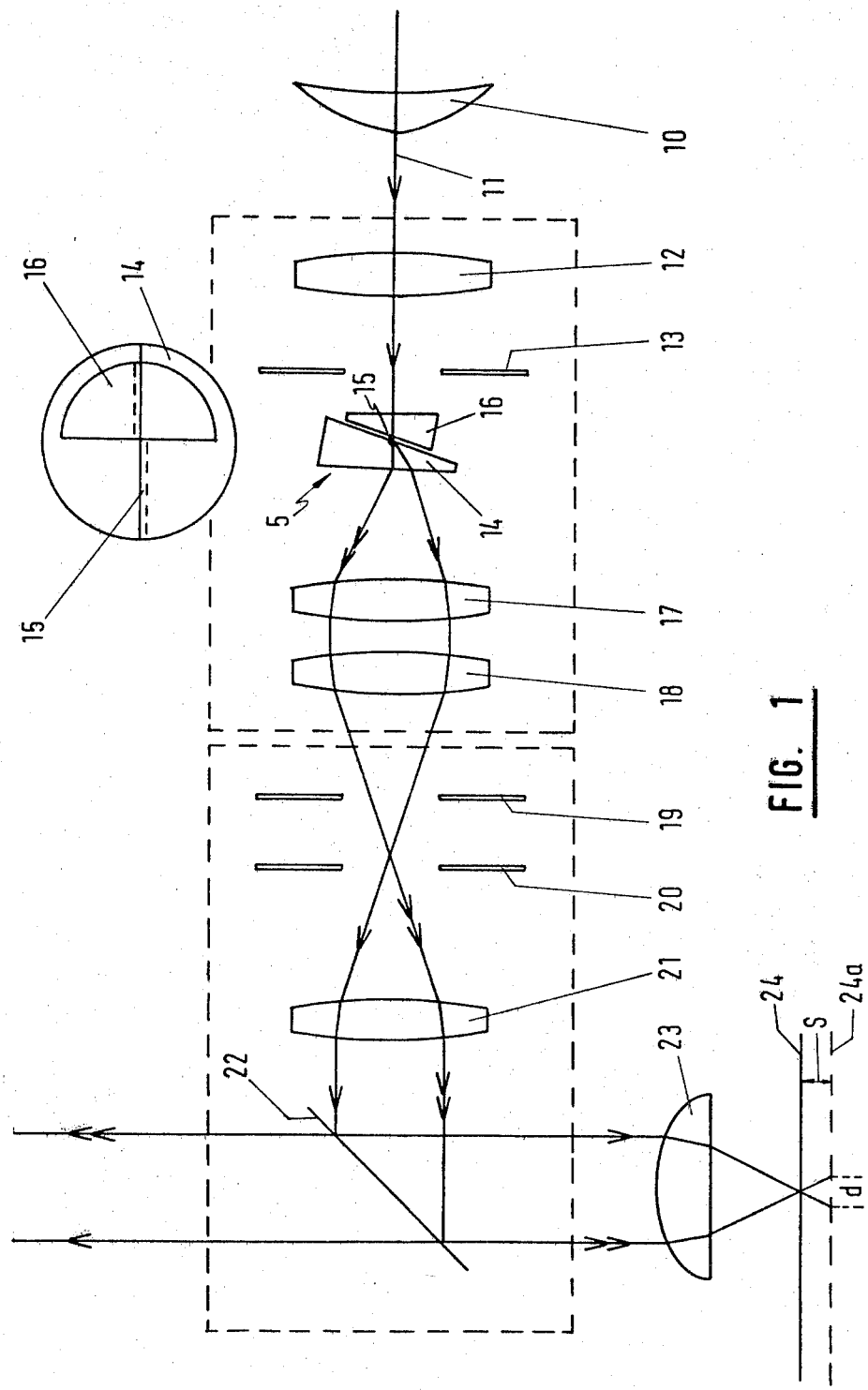
FIG. 1 is a diagrammatic illustration of a first embodiment of microscope.
Figure 2:
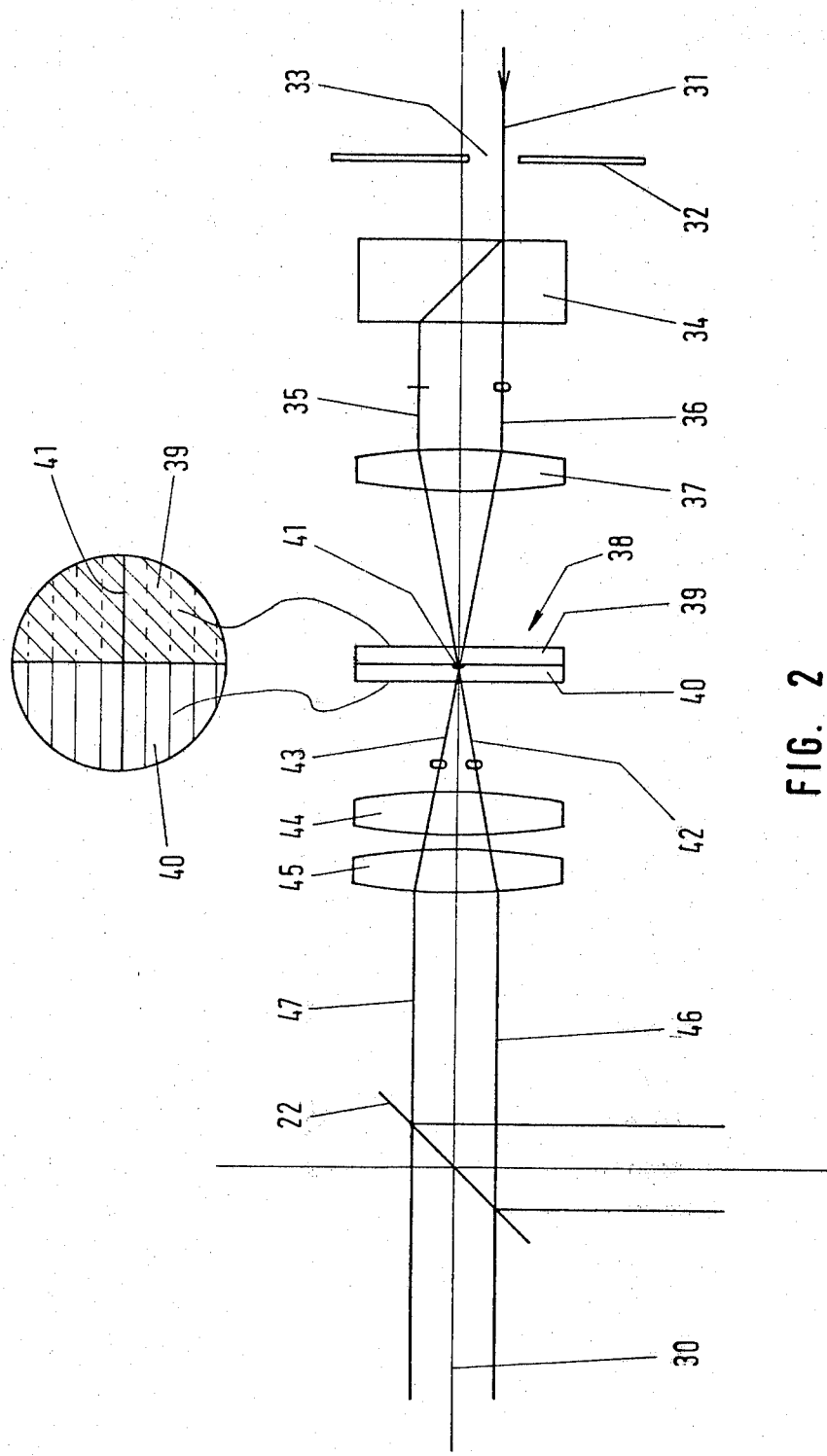
FIG. 2 is a diagrammatic illustration of an alternative construction for part of the microscope shown in FIG. 1.
Figure 3:
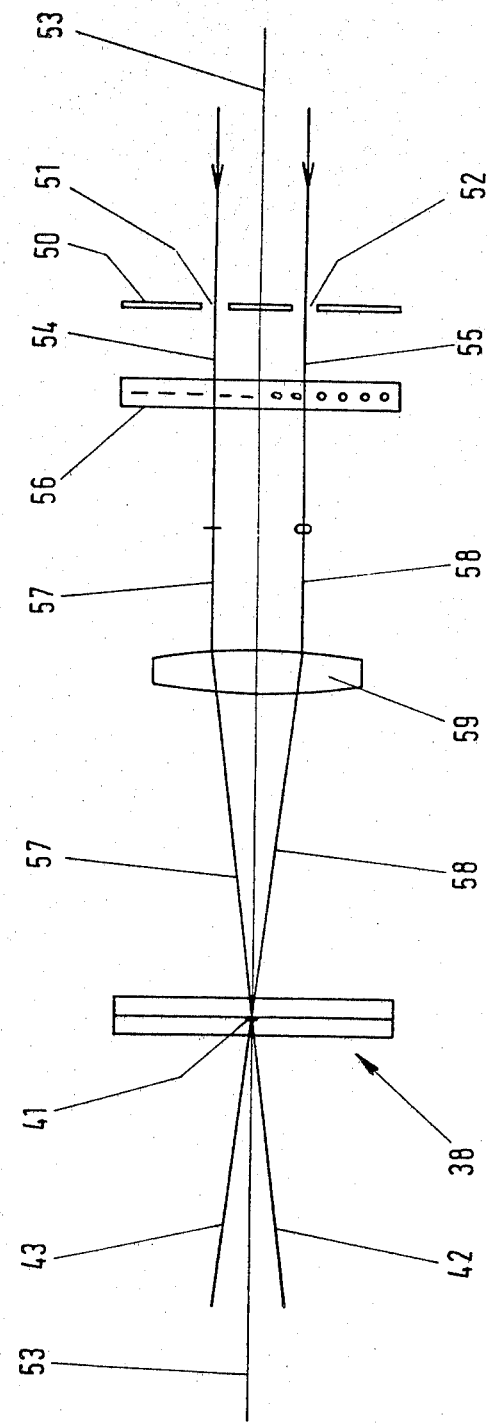
FIG. 3 is a diagrammatic illustration of a further modification to the construction of microscope shown in FIG. 1.

Referring now to FIG. 1 of the drawings, a lens 12 images a lamp condenser 10 into the vicinity of a special prism assembly 5 arranged at a field-illuminating plane. In this particular version of the invention, the assembly 5 consists of a base prism 14 and a semi-circular prism 16 having about twice the angle of the base prism 14. 15 is an opaque fiducial line on the base prism 14. The assembly 5 is shown in an inset in the Figure.

It will be noted from the drawing that the prism assembly, formed by prisms 14 and 16, is arranged with the incident surface of the prism 16 perpendicular to the optical axis of the apparatus and directly in the path of an incident light beam 11.

Also, the prisms 14 and 16 are coupled together with their adjacent surfaces as close together as possible, in order to minimise ray separation in the vicinity of the fiducial line 15 and thereby provide sharpest possible focusing of the fiducial line 15.

On its way to the assembly 5, light beam 11 passes through a specially provided aperture diaphragm 13, which is substantially imaged into the plane of the microscope's conventional aperture iris diaphragm 19 by lenses 17 and 18. However, the prism assembly 5 splits the beam into the divergent light beams so that the respective images of the aperture diaphragm 13 formed in the plane of the diaphragm 19 are laterally displaced from the instrument axis in opposite directions. These two virtual illuminating apertures are imaged into the vicinity of the microscope's objective lens 23 by lens 21, via a field diaphragm 20 and a conventional beam-splitting plate 22.

The fiducial line 15 is focused upon the viewed specimen surface 24 by the objective lens 23 when the microscope focus is correct, for which purpose the microscope is accurately calibrated. The two images of the line then fuse into a single line, as indicated by the full horizontal line of the figure inset. However, it can be seen that if the surface is moved to 24a, then the images of the fiducial line will separate by a transverse distance d and the line will appear as shown by the two dashed lines in the figure inset. As shown in the diagram, $d = 2s \tan \arcsin(NA/2)$ where s is the amount of defocus along the instrument axis and NA is the microscope objective's numerical aperture. It is assumed that the centre line of each beam is inclined at an angle corresponding to half the objective's numerical aperture, but this is in no way essential to the invention.

In practice, the separation d is doubled by virtue of reflection at the specimen surface 24, provided that the latter is substantially specular, i.e. virtually a mirror. The image may be viewed through an eyepiece or T.V. camera (not shown).

It could be advantageous to replace the single fiducial lines with a plurality of lines so that focus settings could be made at more than one point in the microscope field.

In a preferred embodiment the components 13, 14, 15 and 16 can be conveniently switched out of the optical path to permit easy return to conventional conditions. In practice, the components 12 to 18 can be provided as a module which can be removed from the path of the light beam 11, and replaced by a simple module which would contain a field lens equivalent to the single lens 18. In this manner, the lenses 17 and 18 can be provided as a doublet, each specially corrected. By providing the components 12 to 18 as a module, the advantage is obtained that an existing microscope may readily be consurface in order to render the images of said fiducial line formed by the objective lens uniquely co-linear at a short conjugate of the objective lens in the vicinity of said reflective surface.

2. Apparatus according to claim 1, including a prism assembly arranged at said field-illuminating plane to split an incident light beam so as to provide said two beams of light.

3. Apparatus according to claim 2, in which said prism assembly includes a prism provided with said fiducial line.

4. Apparatus according to claim 3, in which said prism assembly includes a further prism arranged adjacent to said prism provided with said fiducial line, said further prism being arranged with its incident surface perpendicular to, and directly, in the path of said incident light beam.

5. Apparatus according to claim 1, in which said means for producing at least two light beams comprises an aperture diaphragm, a double-refracting crystal for producing two orthogonally polarised virtual images of said aperture, a lens for focusing the polarised light beams at said field-illuminating plane, and a selector plate provided with said fiducial line and arranged at said field-illuminating plane for converting the polarised light beams into said two divergent light beams.

6. Apparatus according to claim 1, in which said means for producing at least two light beams comprises a double aperture diaphragm plate for producing two parallel light beams, a bipolar plate for producing two orthogonally polarised light beams, a lens for focusing the polarised light beams onto said field illuminating plane, and a selector plate arranged at said field illuminating plane for converting the polarised light beams into said two divergent light beams.

7. Optical viewing apparatus provided with a focussing arrangement and comprising:
   means for providing two beams of light which are mutually inclined at a fixed angle; means for converging said beams of light in the vicinity of a reflective viewed surface; and means for adjusting the relative distance between the apparatus and said surface until said beams coincide at said surface;
   in which a modular assembly is removably arranged along the optical axis of the apparatus and comprises a lens, an aperture diaphragm, a prism assembly and a doublet which are arranged to convert a single incident light beam into said two mutually inclined beams of light.

8. Apparatus according to claim 7, in which said aperture diaphragm has two apertures.

* * * * *

United States Patent [19]

Schönhut

[11] 4,406,527
[45] * Sep. 27, 1983

[54] METAL FRAME FOR EYEGLASSES

[76] Inventor: Kurt Schönhut, Kolomanstrasse 41, D-7070 Schwäbisch Gmünd-Wetzgau, Fed. Rep. of Germany

[*] Notice: The portion of the term of this patent subsequent to Jul. 7, 1998 has been disclaimed.

[21] Appl. No.: 244,937

[22] Filed: Mar. 18, 1981

Related U.S. Application Data

[63] Continuation of Ser. No. 944,671, Sep. 22, 1978, Pat. No. 4,277,151.

[30] Foreign Application Priority Data

Nov. 7, 1977 [DE] Fed. Rep. of Germany ....... 2749796

[51] Int. Cl.³ .......................... G02C 1/08; G02C 5/22
[52] U.S. Cl. ..................................... 351/153; 351/90
[58] Field of Search .................... 351/52–58, 351/68–93, 100–106, 141, 142, 178, 41; 2/450; 16/228

[56] References Cited

U.S. PATENT DOCUMENTS 2,272,782  2/1942  Styll ........................ 351/93
2,337,560 12/1943  Kammel .................. 351/93
2,355,053  8/1944  Carlson ................... 351/104
2,385,693  9/1945  Cozzens et al. ......... 351/93
2,939,168  6/1960  Ferron ..................... 351/121
3,874,775  4/1975  Lazarus ................... 351/41

FOREIGN PATENT DOCUMENTS 820331 9/1959 United Kingdom ............... 351/104

Primary Examiner—John K. Corbin
Assistant Examiner—Rodney B. Bovernick
Attorney, Agent, or Firm—Allison C. Collard; Thomas M. Galgano

[57] ABSTRACT

A metal frame for eyeglasses is provided which includes a pair of rims, each of which is configured to surround and support an eyeglass lens, and a locking bar secured to each of the rims. The locking bar and the rim to which it is secured are separated by a separation slot so as to divide the rim and the bar into first and second rim portions and first and second locking bar segments respectively. A jacket having an internally threaded bore is coupled to the first locking bar segment to prevent movement thereof relative to the first locking bar segment towards the second locking bar segment, and a locking bar screw is detachably coupled to the second locking bar segment and is in threaded engagement with the bore of the jacket.

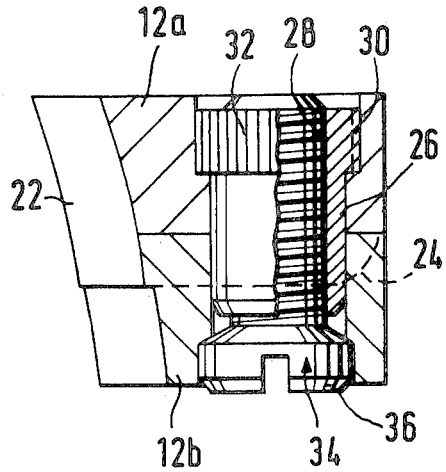

9 Claims, 4 Drawing Figures